Patented July 20, 1943

2,324,483

UNITED STATES PATENT OFFICE 2,324,483

PROCESS OF PREPARING SYNTHETIC RESINS

Pierre Castan, Zurich, Switzerland

No Drawing. Application February 16, 1942, Serial No. 431,157. In Switzerland August 23, 1938

10 Claims. (Cl. 260—47)

The present invention refers to the production of thermosetting artificial resins and is in part a continuation of my U. S. application Ser. No. 250,225, filed January 10, 1939.

It is known in the art to produce artificial resins by condensing ethylene oxide or derivatives thereof e. g. chlorohydrines with polyvalent carboxylic acids.

The process according to the present invention comprises condensing a polybasic carboxylic acid anhydride with the product of reaction, in alkaline solution, of a polyhydroxy phenol and epichlorhydrine, the said product containing at least two ethylene oxide groups. The ethyleneoxide-derivative and the acid anhydride may either be monomolecular or already partially polymerised.

A primary difference between the products obtained by the process of this invention and the products obtainable according to the process described above is discernible in the fact that in the preparation of alkyd resins the times of reaction are very long and may extend over several days. In the present case on the other hand the reaction is completed in about one hour when working at a temperature of about 170° C. The working at these high temperatures which determines the short reaction time is only rendered possible by the high boiling points of the products of condensation of epichlorhydrine and polyvalent phenols, used as starting materials. During the entire reaction period there is no formation of volatile products or water so that the reaction mass does not become frothy and can be treated at normal pressure without danger that the final resin may contain bubbles.

The hardened resins do not contain alcoholic hydroxy groups and are therefore not at all sensitive to water, their hardness and other properties of strength are extremely and their resistance to a subsequent change in colour is also very good.

With regard to the reaction itself there is no danger that an equilibrium reaction between ester and water is involved, but only a simple addition reaction accompanied by polymerization.

All these advantages which are not obtainable with the glycides of monohydroxyphenols are due to the fact that as starting materials use is made of entirely novel products namely the products containing two or more ethylene oxide groups obtainable by reacting polyhydroxyphenols with epichlorhydrine in alkaline solution.

For the preparation of the reaction product between the phenol and the epichlorhydrine, use may conveniently be made of the following phenols:

Bivalent phenols such as hydroquinone, resorcinol and the condensation products of phenols with saturated aliphatic-, arylaliphatic-, aryl- and cyclic-ketones, for instance 4-4′-dihydroxy diphenyl-2.2-propane.

As acid anhydrides the anhydrides of all dibasic acids, such as succinic acid, maleic acid, phthalic acid and its derivatives which are substituted in the nucleus, can be used as well as hydrogenated phthalic acids. The acid anhydrides, which are produced by dienesyntheses can also be used, for instance the acid anhydrides which are derivated from eleostearic-acid-glyceride and maleic acid-anhydride, also those of maleic acid-anhydride plus Chinese-wood oil terpinene or limonene or other unsaturated hydrocarbons of the terpene series. Polymerised acid anhydrides can also be used, i. e. polyadipic acid-anhydride, polysebacic acid-anhydride etc.

The condensation of the products of reaction in alkaline solution of a polyhydroxy phenol and epichlorhydrine is effected by mixing the molten products together and keeping so long at a certain temperature until they show the desired features. Temperature and time vary according to the material used and to the properties desired. It is also possible to proceed in such a way as not to finish the reaction in one step, but to interrupt it at a certain stage and to proceed with the final hardening at a later date. This method gives products which are suitable for cast or moulded articles. The advantage may be particularly pointed out that the hardening can be effected very quickly in open forms at high temperatures, because in this reaction no volatile substances are formed which could lead to the formation of bubbles.

Examples 1. 110 grams resorcin are dissolved in 2 gramme-molecules of a 20% solution of caustic soda, heated up to 75° C. and in the course of ½ hour, 185 grams epichlorhydrine are added drop by drop with continuous stirring. Then the process is continued as described in the second example, infra. To the desiccated substance i. e. the substance free from water, is added the substance which has been obtained by condensing 132 grams of terpinene with 98 grams maleic-acid-anhydride. This is heated for 30 minutes at 110°, cooled and pulverised. A hard resin results which is insoluble and infusible when heated for one hour at 150° C.

2. 228 grams of 4.4'-dihydroxy-diphenyl-2.2-propane are dissolved in 2 gramme-molecules of a 15% caustic soda solution and heated to 65° C. To this solution 185 grams of epichlorhydrine are added drop by drop in the course of one hour at the same temperature with continuous stirring. At first, a soft resin is formed, which becomes more and more hard. After the desired consistency has been reached, the resin is washed free from chloride. The resin can also be dissolved in acetone and the deposited salts separated by filtering. Then the resin is freed from water (eventually also from the solvents). A hard resin of a light yellowish colour remains. Its melting point is about 75° C. This resin is then melted and at 120° C., 140 grams of molten phthalic acid-anhydride are added. The temperature is maintained at 120° for one hour and the product then cooled; a light yellowish resin results which in 30 minutes at 170° becomes infusible and insoluble. The unhardened resin is soluble in acetone, chloroform and a 1:4 alcohol-benzol solution; it is insoluble in water, benzol, alcohol, carbon-tetrachloride.

3. After desiccation, 300 grams of the resin obtained according to Example 2 from 4.4'-dihydroxy-diphenyl-2.2-propane and epichlorhydrine are mixed with 125 grams of polyadipic-acid-anhydride. The temperature is maintained at 130° C. for one hour and then cooled. A resin which hardens at 150° C. in 1½ hours and which is rather elastic results.

The resins as long as they are not hardened are products which become soft between 40–80° C. They are usually soluble in acetone, chloroform and a 1:4 alcohol-benzol solution. In carbon-tetrachloride and benzol they are but little soluble or insoluble. They harden quickly at temperatures between 150° C.–170° C.

The hardened substances are hard but not brittle, of a light yellowish or brown colour. They are not sensitive to light, and water up to 80° C. They resist temperatures up to 100° C. and are not easily inflammable. They can be worked without difficulties either by filing, shaping, turning etc. They adhere very well to glass, porcelain and metals and are good insulating materials. As they can be hardened in open vessels without the risk of porous pieces occuring, they can very well be used for cast articles. They can also be used in form of moulding-powders.

If necessary, the resins can be coloured in any shades either with organic or inorganic dyes. Filling materials, such as asbestos, wood-meals etc. can also be added to them, also plasticizers such as esters of phthalic-acid, benzyl-benzoate, "Sipaline" (adipic ester of cyclohexanol or methyl cyclohexanol or a mixture of both of these products) etc.

The products obtained can be used for cast and moulded and pressed articles such as fancy-goods, electro-technical articles, billiard balls, dentures. In the form of solution, they can also be used as varnish which hardens very quickly, offers great adherence and good resistance.

I claim:

1. A process for the production of thermosetting resins which comprises condensing a polybasic carboxylic acid anhydride with the product of reaction, in alkaline solution, of a phenol having at least two phenolic hydroxy groups and of an epichlorhydrine the said product containing at least two ethylene oxide groups.

2. A process defined in claim 1, the said polybasic carboxylic acid anhydride being at least partly polymerized.

3. A process defined in claim 1, the said product of reaction being at least partly polymerized.

4. A process for the production of thermosetting resins which comprises condensing a dibasic carboxylic acid anhydride with the product of reaction in alkaline solution of a phenol having at least two phenolic hydroxy groups and epichlorhydrine, the said product containing two ethylene oxide groups.

5. A process for the production of thermosetting resins which comprises condensing phthalic acid anhydride with the product of reaction, in alkaline solution of a phenol having two phenolic hydroxy groups with epichlorhydrine, the said product containing two ethylene oxide groups.

6. A process for the production of thermosetting resins which comprises condensing a phthalic anhydride with the product of a reaction in alkaline solution of resorcinol and two mols of epichlorhydrine per mol of resorcinol.

7. A process for the production of thermosetting resins which comprises condensing a dibasic carboxylic acid anhydride with the product of a reaction in alkaline solution of 4-4'-dihydroxy-diphenyl-2,2-propane and two mols of epichlorhydrine per mol of 4-4'-dihydroxy-diphenyl-2,2-propane.

8. A process for the production of thermosetting resins which comprises condensing phthalic anhydride with the product of a reaction in alkaline solution of 4-4'-dihydroxy-diphenyl-2,2-propane and two mols of epichlorhydrine per mol of 4-4'-dihydroxy-diphenyl-2,2-propane.

9. A process for the production of thermosetting resins which comprises condensing partially polymerized adipic acid with the product of a reaction in alkaline solution of a phenol having at least two phenolic hydroxy groups and epichlorhydrine.

10. A process for the production of thermosetting resins which comprises condensing partially polymerized adipic acid with the product of a reaction in alkaline solution of a phenol containing two phenolic OH groups and two mols of epichlorhydrine per mol of the phenol.

PIERRE CASTAN.